Oct. 9, 1934.  W. F. HEINEMAN  1,976,343
ALIGNING SHEET METAL EDGES FOR ELECTRIC WELDING
Filed June 24, 1933
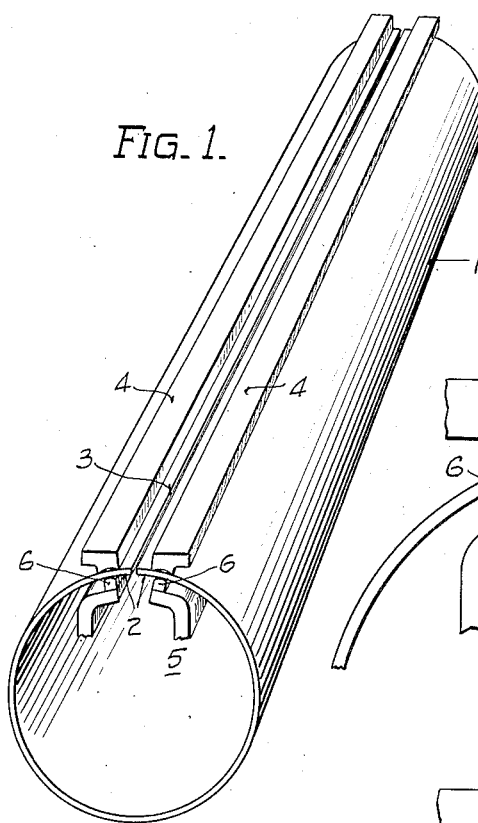
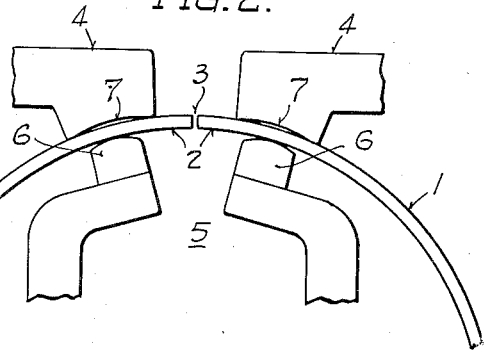
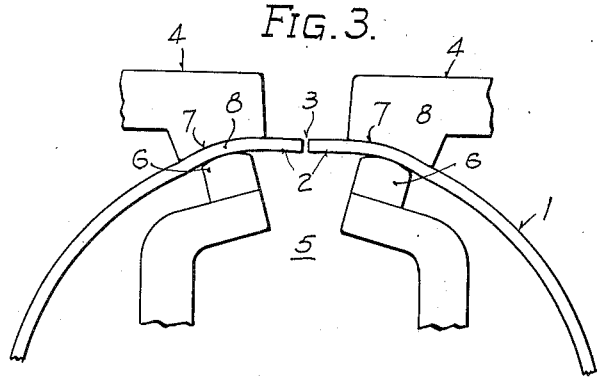
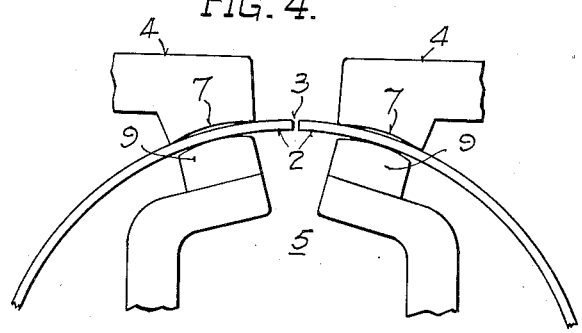
INVENTOR.
Warren F. Heineman
BY
ATTORNEY.

Patented Oct. 9, 1934

1,976,343

UNITED STATES PATENT OFFICE 1,976,343

ALIGNING SHEET METAL EDGES FOR ELECTRIC WELDING

Warren F. Heineman, Shorewood, Wis., assignor to A. O. Smith Corporation, Milwaukee, Wis., a corporation of New York Application June 24, 1933, Serial No. 677,385

4 Claims. (Cl. 219—10)

This invention relates to aligning sheet metal edges for electric welding and more particularly to the aligning of the longitudinal edges of thin walled metal pipe for flash welding such as illustrated in the patents issued to Nilson et al. No. 1,872,793 and to Andren et al. No. 1,872,055.

The object of the invention is to obtain more accurate alignment of the edges for welding.

Another object is to reenforce the pipe wall adjacent the edges during application of the final upsetting pressure in flash welding to obtain an accurate abutment of the edges.

Another object is to prevent rocking of the electrodes tending to burn the electrodes and metal wall of the blank during movement in welding.

The invention resides primarily in distorting the blank in a predetermined manner adjacent the edge portion subjected to the welding heat whereby the latter is firmly held in a predetermined position for welding.

One way of carrying out the invention is illustrated in the accompanying drawing in which:

Figure 1 is a perspective view of a portion of a machine such as that illustrated in the patent referred to above, modified for the purpose of this invention, Fig. 2 is an end elevation in larger scale of the electrode and arbor clamping means, Fig. 3 is a similar view showing the parts in clamping position, and Fig. 4 is a view similar to Fig. 2 showing a modified form of clamping means.

The pipe blank 1 to be welded is formed from a flat sheet of metal with its side edges 2 opposed to provide a seam cleft 3 for welding on a longitudinal line of the blank.

Electrodes 4 are applied to the blank on opposite sides of the seam cleft 3 and extend the entire length of the blank or of the seam to be welded.

An arbor 5 is positioned within the blank for clamping the blank against the electrodes as described in the patents referred to above.

In operation, the blank edges are first closed by suitable means to bring them into general longitudinal alignment and then the pressure bars 6 of the arbor and the electrodes 4 are moved relatively together to clamp the blank with the edges in alignment. The subsequent welding operation is preferably that described in the patents above referred to, although various modified forms of flash welding may be employed.

The electrodes 4 and pressure bars 6 are spaced from the original edges 2 a predetermined distance to allow a given portion of the edges to be flashed away in the welding operation and to provide metal for the upsetting operation at the completion of the weld.

Where the pipe wall to be welded in this manner is flexible, difficulty is generally encountered in obtaining accurate transverse and longitudinal alignment of the edge portions protruding from beneath the electrodes. When the electrodes are narrow and curved either to conform to the radius of the blank, or in the opposite direction, the edge portions of the blank are apt to contain waves which do not conform to the opposite edge portions. This results in an improper flashing of the edges, and during the final upsetting of the edges the lack of direct opposition between the edges when transverse pressure is applied causes a slippage of one edge over the other, making an imperfect weld. That is where the edges are misaligned, the flashing arc burns them at an angle and when pressure is applied the angular meeting edges slip or climb over one another, effecting an overlapping thereof rather than a direct abutment and upset.

In overcoming this difficulty, the present invention provides the electrode with a recessed face 7 of a transversely curved contour of less radius than the radius of the blank, as clearly shown in Fig. 2. The pressure bar 6 is preferably narrow and has a curved face to conform with that of the electrode.

In carrying out the invention, in the clamping of the blank between the electrodes 4 and pressure bars 6, the blank is forced into the recess in the face 7 of the electrode, so that the blank portion beneath the electrode is curved on a radius conforming to that of the electrode face and less than that of the rest of the blank. The result is the formation of a longitudinal rib or corrugation 8 which tends to stiffen the blank adjacent the edges. Furthermore, the various waves in the edge portions of the blank are removed and the edge portions are straightened so that they may be readily and accurately aligned for welding.

The invention also provides a fixed contact between the electrode and the blank for passage of the welding current and prevents rocking of the electrode on the surface of the blank and consequent burning of the latter.

Where the pipe wall is very thin it is preferable to employ the construction illustrated in Fig. 4 in which the pressure bars 9 are of substantially the same width as the recessed faces 7 of the electrodes 4. This insures a proper contact of the electrodes with the blank at the inner longitudinal edges of the electrodes.

Various embodiments of the invention may be employed within the scope of the accompanying claims.

I claim:

1. In a machine for electric flash welding a longitudinal seam in tubular articles, a relatively narrow electrode extending parallel to the seam to be welded and having a recessed face of a transverse curvature of less radius than that of the blank, and means for pressing a portion of the blank adjacent an edge portion into the recess of the electrode face to effect a straightening of the edge portion at the seam for alignment with the opposite edge portion and for welding.

2. The method of preparing or arranging thin sheet metal edges for electrically welding the same, comprising bringing the edges into straight lines longitudinally thereof by bending narrow strips of the edge portions close to and parallel said edges to a predetermined curvature of different radius than the remainder of such edge portions immediately adjacent such strips, aligning the edges, and clamping the curved strips of the blank to hold the edges in alignment for welding.

3. In the electric flash welding of a longitudinal seam in pipe, the method of straightening the edges comprising bending a narrow portion of the blank adjacent and parallel each edge portion to a curvature having a radius less than that of the blank immediately adjacent such narrow curved portion, and clamping said curved portions to hold the edges straight.

4. In the electric flash welding of a longitudinal seam in pipe, the method of making the edges straight for welding, comprising bending a longitudinally extending narrow portion of the blank wall adjacent each edge portion to a predetermined shape differing from the curvature of the blank immediately adjacent such bent portion, and clamping the said bent portions to hold the edges straight.

WARREN F. HEINEMAN.